United States Patent [19]

Okubo

[11] Patent Number: 4,952,003
[45] Date of Patent: Aug. 28, 1990

[54] APPARATUS FOR CONTROLLING BRAKE FLUID PRESSURE OF MOTOR VEHICLE

[75] Inventor: Satomi Okubo, Saitama, Japan

[73] Assignees: Akebono Brake Industry Co., Ltd., Tokyo, Japan; Akebono Research and Development Centre Ltd., Saitama, Japan

[21] Appl. No.: 381,842

[22] Filed: Jul. 19, 1989

[30] Foreign Application Priority Data

Aug. 4, 1988 [JP] Japan .................. 63-193431

[51] Int. Cl.[5] .............................................. B60T 8/32
[52] U.S. Cl. ........................................ 303/119; 303/52; 303/114; 303/116; 303/110; 188/345
[58] Field of Search ............... 303/113, 114, 116, 119, 303/52, 56, 110, 100, 92; 60/547.1; 188/181, 355–358, 345; 180/197

[56] References Cited

U.S. PATENT DOCUMENTS

| 4,416,491 | 11/1983 | Belart et al. | 303/52 |
| 4,641,895 | 2/1987 | Belart et al. | 303/119 |
| 4,790,608 | 12/1988 | Burgdorf et al. | 303/52 X |
| 4,805,965 | 2/1989 | Jonner et al. | 303/100 |

Primary Examiner—Douglas C. Butler
Attorney, Agent, or Firm—Finnegan, Henderson, Farabow, Garrett, and Dunner

[57] ABSTRACT

There is disclosed an apparatus for controlling brake fluid pressure of a vehicle. A supply valve of the normally closed type is opened only at the time of an anti-lock control so as to supply fluid pressure from an accumulator to a pressure fluid chamber of a master cylinder. An intake valve normally shuts off the communication between the accumulator and the fluid pressure chamber. A valve operating member for movement with a main piston of the master cylinder is engageable with a distal end of the intake valve projecting into the fluid pressure chamber to open the intake valve when the stroke of the main piston reaches a predetermined value, thereby communicating the fluid pressure chamber with the accumulator. An auxiliary piston is slidably mounted around the main piston so as to urge the main piston to move at the time of the traction control. A fluid pressure within an auxiliary fluid pressure chamber provided around the auxiliary piston acts on the auxiliary piston. An anti-lock valve of the normally open type is provided in a fluid passage, connecting the auxiliary fluid pressure chamber to that portion of a fluid passage extending between the supply valve and the intake valve, so as to be opened only at the time of the anti-lock control. A traction valve of the normally open type is provided in a fluid passage, connecting the auxiliary fluid pressure chamber to a reservoir, so as to be closed only at the time of the traction control.

16 Claims, 6 Drawing Sheets

APPARATUS FOR CONTROLLING BRAKE FLUID PRESSURE OF MOTOR VEHICLE

Field of the Invention

The present invention relates generally to an apparatus for controlling brake fluid pressure of motor vehicles. More particularly, the invention relates to a brake fluid pressure control apparatus for use in an anti-lock control for preventing a wheel slip at the time of braking the vehicle and also for use in a traction control for preventing a wheel slip at the time of starting the vehicle or accelerating it.

BACKGROUND OF THE INVENTION

In an anti-lock control apparatus designed to prevent the locking of vehicle wheels at the time of braking the vehicle so as to ensure the steerability and running stability of the vehicle and to shorten the braking distance, the control modes of the brake fluid pressure (i.e., a pressure increasing mode, a pressure decreasing mode and a pressure holding mode) are determined in accordance with electrical signals from speed sensors for sensing the speeds of the respective vehicle wheels. In accordance with such pressure control mode, hold valves and decay valves both of a solenoid valve selectively open and close so as to increase, hold or reduce the brake fluid pressure. Such brake fluid pressure control is effected under the control of a microcomputer.

There is known a brake fluid pressure control apparatus of the type in which a fluid pressure control portion (modulator) for effecting the above-mentioned anti-lock control is incorporated in a master cylinder. In such an apparatus as disclosed in U.S. Pat. No. 4,641,895, the master cylinder comprises a primary piston and a secondary piston arranged in series therewith, which is known as of the tandem type, and brake fluid pressures in two brake lines of the brake device of the dual circuit type are controlled by the primary and secondary pistons, respectively. Hold valves of the normally open type are provided respectively in fluid passages connecting two fluid pressure chambers respectively to wheel cylinders, the fluid pressures in the two fluid pressure chambers being controlled by the primary and secondary pistons, respectively. Decay valves of the normally closed type are provided in fluid passages connecting the wheel cylinders respectively to a reservoir.

With such a construction, when a brake pedal is pressed down, the fluid pressures in the two fluid pressure chambers of the master cylinder are supplied to the respective wheel cylinders through the respective hold valves to increase the fluid pressures in the wheel cylinders, thereby applying a braking force to the wheels. When the anti-lock control starts to be operated, the hold valves close to hold or maintain the brake fluid pressures. Further, when the decay valves open, with the hold valves kept closing, the brake fluids in the wheel cylinders is relieved to the reservoir through the decay valves, so that the fluid pressures in the wheel cylinders are reduced, thereby reducing the braking force. Also, in the pressure increasing mode of the anti-lock control, the hold valves are operated into the open condition, and the pistons are operated by the brake fluid of high pressure supplied from a fluid pressure source such as an accumulator to thereby increase the fluid pressures in the wheel cylinders.

However, if any malfunction should develop in the fluid pressure source system, e.g., a fluid pressure pump or an accumulator, for example, the accumulator leaks a fluid pressure contained therein, during the anti-lock control, the braking force becomes inadequate. To compensate for this, the brake pedal has to be further pressed down, so that the brake pedal can not be still further be pressed down adequately (that is, there is no sufficient room for further pressing-down).

Further, in the case where in addition to the above-mentioned anti-lock control, the above brake fluid pressure control apparatus is designed to perform a traction control in such a manner that the brake fluid of high pressure from the fluid pressure source acts on the pistons as in the anti-lock control, the braking force becomes excessive. This not only imparts vibration to the vehicle body to provide an uncomfortable ride feeling but also to apply an undesirable load to the drive system of the vehicle.

SUMMARY OF THE INVENTION

The present invention was made in view of the above difficulties accompanying the conventional apparatus.

It is therefore an object of this invention to provide an apparatus for controlling brake fluid pressure of a vehicle which can secure a braking force of a predetermined level even if the fluid pressure source system is subjected to malfunction during an anti-lock control.

Another object of the invention is to provide a brake fluid pressure control apparatus in which a fluid pressure required for a traction control can be freely set or determined.

The above and other objects of the invention have been accomplished by an apparatus for controlling brake fluid pressure of a vehicle which, according to the present invention, comprises a hold valve and a decay valve for increasing, holding and decreasing a brake fluid pressure when effecting an anti-lock control and a traction control, said hold valve being provided in a first fluid passage connecting a fluid pressure chamber of a master cylinder to a wheel cylinder, and said decay valve being provided in a second fluid passage connecting said wheel cylinder to a reservoir.

The apparatus of the invention is improved by comprising: a third fluid passage connecting said fluid pressure chamber of said master cylinder to an accumulator; a supply valve of the normally closed type provided in said third fluid passage so as to be opened when effecting the anti-lock control and the traction control; an intake valve movably received in an opening of said third fluid passage which opens to said fluid pressure chamber, a distal end of said intake valve being movable into and out of said fluid pressure chamber, and said intake valve normally shutting off said third fluid pressure chamber; a valve operating member mounted on a main piston of said master cylinder for movement therewith, said valve operating member being engageable with the distal end of said intake valve projecting into said fluid pressure chamber to open said intake valve when the stroke of said main piston reaches a predetermined value; an auxiliary piston slidably mounted around said main piston so as to urge said main piston to move at the time of the traction control; an auxiliary fluid pressure chamber formed between said auxiliary piston and a housing of said master cylinder, a fluid pressure within said auxiliary fluid pressure chamber acting on said auxiliary piston; a fourth fluid passage connecting said auxiliary fluid pressure chamber to that portion of said third fluid passage extending between said supply valve and said intake valve; an anti-lock valve of the normally open type provided in said fourth fluid passage so as to be opened only at the time of the anti-lock control; a fifth fluid passage connecting said auxiliary fluid pressure chamber to said reservoir; and a traction valve of the normally open type provided in said fifth fluid passage so as to be closed only at the time of the traction control.

DESCRIPTION OF THE PREFERRED EMBODIMENT

A preferred embodiment of the invention will now be described in detail with reference to accompanying drawings.

Figure 1:
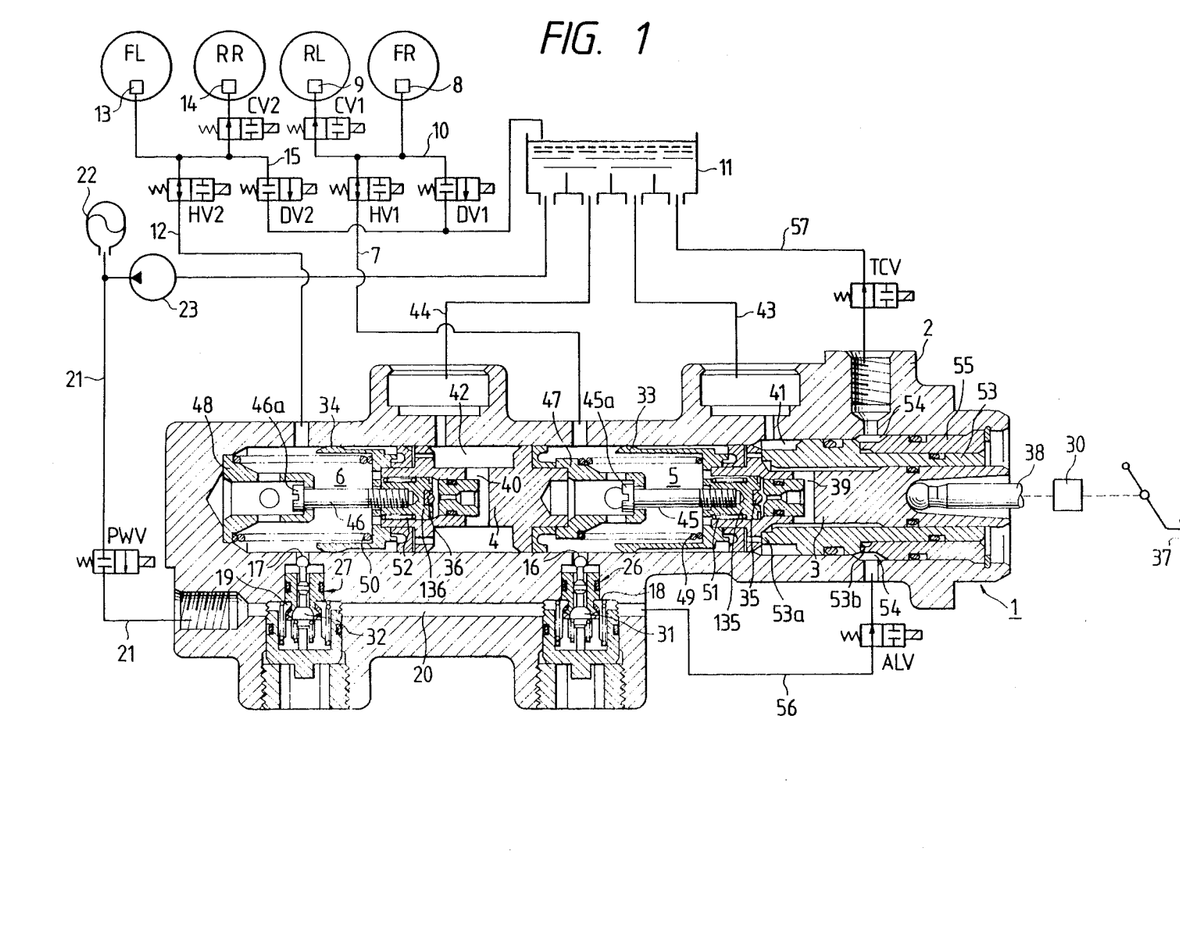
FIG. 1 is a cross-sectional view of the overall construction of a brake fluid pressure control apparatus provided in accordance with the present invention, cross-sectionally showing a main portion thereof.

FIG. 1 shows a brake fluid pressure control apparatus for use in a dual circuit brake device of the cross pipe line type (X pipe line type) of a front wheel drive-type vehicle. A master cylinder 1 of the tandem type comprises a primary piston 3 and a secondary piston 4 both of which are mounted within a master cylinder housing 2. The housing 2 has fluid pressure chambers 5 and 6 of which fluid pressures are controlled by the pistons 3 and 4, respectively.

The fluid pressure chamber 5 fluid pressure of which is controlled by the primary piston 3 is connected to a wheel cylinder 8 of a right front wheel FR through a fluid passage 7 in which a hold valve HV1 of a normally open-type solenoid valve is provided. The fluid pressure chamber 5 is also connected to a wheel cylinder 9 of a left rear wheel RL through a cut valve CVl of a normally open-type solenoid valve which closes only at the time of a traction control. The wheel cylinders 8 and 9 are connected to a reservoir 11 through a fluid passage 10 in which a decay valve DVl of a normally closed-type is provided.

Similarly, the fluid pressure chamber 6 fluid pressure of which is controlled by the secondary piston 4 is connected to a wheel cylinder 13 of a left front wheel FL through a fluid passage 12 in which a hold valve HV2 of a normally open-type solenoid valve is provided. The fluid pressure chamber 6 is also connected to a wheel cylinder 14 of a right rear wheel RR through a cut valve CV2 of a normally open-type solenoid valve which closes only at the time of the traction control. The wheel cylinders 13 and 14 are connected to the reservoir 11 through a fluid passage 15 in which a decay valve DV2 of a normally closed-type is provided.

Valve chambers 18 and 19 are formed in the housing 2 of the master cylinder 1 and have openings 16 and 17, respectively, which open to the fluid pressure chambers 5 and 6, respectively. The valve chambers 18 and 19 are connected together through a fluid passage 20 formed in the housing 2. The valve chamber 19 is connected to an accumulator 22 through a fluid passage 21 in which a supply valve PWV of a normally closed-type solenoid valve is provided. The accumulator 22 is connected to the output side of a fluid pressure pump 23, while the suction side of the fluid pressure pump 23 is connected to the reservoir 11. The accumulator 22 serves to always store fluid pressure of a constant level by means of the pump 23. Valve mechanisms 26 and 27 (later described), respectively having intake valves 31 and 32 which also serve as check valves, are mounted within the valve chambers 18 and 19, respectively.

Cylindrical intake sleeves 33 and 34 are fixed to the primary and secondary pistons 3 and 4, respectively, and disposed in the fluid pressure chambers 5 and 6, respectively. The intake sleeves 33 and 34 serve to operate the intake valves 31 and 32, respectively. The primary and secondary pistons 3 and 4 contain respective center valves 35 and 36 which are movable relative to the primary and secondary pistons 3 and 4, respectively, along the axis of the master cylinder 1. The center valves 35 and 36 are press-fitted into center valve holding members 135 and 136, respectively.

When a brake pedal 37 is not pressed down, so that a push rod 38, connected to the brake pedal 37 through a booster 30, does not push the primary piston 3 as shown in FIG. 1, the fluid pressure chambers 5 and 6 communicate with the reservoir 11 through the respective center valves 35 and 36 which are in their open positions, respective communication passages 39 and 40 formed respectively through the pistons 3 and 4, respective annular chambers 41 and 42 provided around the pistons 3 and 4, and respective fluid passages 43 and 44. Upon pressing-down of the brake pedal 37, the push rod 38 is operated to move the primary piston 3 in a left-hand direction (in FIG. 1), so that the center valve 35 is brought into its closed position, thereby interrupting the fluid communication between the fluid pressure chamber 5 and the reservoir 11. As a result, the fluid pressure within the fluid pressure chamber 5 increases, so that the brake fluid in the fluid pressure chamber 5 is supplied to the wheel cylinders 8 and 9 through the hold valve HV1 in the open condition, thereby braking the wheels FR and RL of one braking line. The increase in the fluid pressure within the fluid pressure chamber 5 causes the secondary piston 4 to move, so that the center valve 36 is brought into its closed position, thereby interrupting the fluid communication between the fluid pressure chamber 6 and the reservoir 11. As a result, the fluid pressure within the fluid pressure chamber 6 also increases, so that the brake fluid in the fluid pressure chamber 6 is supplied to the wheel cylinders 13 and 14 through the hold valve HV2 in the open condition, thereby braking the wheels FL and RR of the other braking line.

These operations are achieved by the provision of stems 45 and 46 threaded end of which are connected to the center valve holding members 135 and 136, respectively, stop bushings 47 and 48 engaging heads 45a and 46a on the other ends of the stems 45 and 46, respectively, compression springs 49 and 50 acting between the stop bushing 47 and the intake sleeve 33 and between the stop bushing 48 and the intake sleeve 34, respectively, and compression springs 51 and 52 provided between the intake sleeves 33, 34 and the center valve holding members 135, 136, respectively, the compression springs 51 and 52 urging the center valves 35 and 36 into their respective closed positions.

An auxiliary piston 53 of a cylindrical shape is mounted in the annular chamber 41 formed between the housing 2 of the master cylinder 1 and the primary piston 3, the auxiliary piston 53 being mounted around the primary piston 3 in coaxial relation thereto and being slidable relative to both the housing 2 and the primary piston 3. A projection 53a on the left-hand end (in FIG. 1) of the auxiliary piston 53 abuts against the primary piston 3. The auxiliary piston 53 has an annular stepped portion or shoulder 53b intermediate opposite ends thereof and facing in a right-hand direction (in FIG. 1) so as to receive pressure. An auxiliary fluid pressure chamber 54 is formed on the right-hand side of the stepped portion 53b. A plug 55 closes the auxiliary fluid pressure chamber 54 and serves to limit the movement of the auxiliary piston 53 in the right-hand direction. The auxiliary fluid pressure chamber 54 communicated with the valve chamber 18, provided in the housing 2, through a fluid passage 56 in which there is provided an anti-lock valve ALV of a normally open-type solenoid valve which closes only at the time of the traction control. With this arrangement, a pressurized brake fluid is adapted to be supplied from the accumulator 22 to the auxiliary fluid pressure chamber 54 via the fluid passage 21, having the supply valve PWV, and the fluid passage 20 interconnecting the valve chambers 18 and 19. Also, the auxiliary fluid pressure chamber 54 communicates the reservoir 11 through a fluid passage 57 in which there is provided a traction control valve TCV of a normally open-type solenoid valve which closes only at the time of the traction control.

Thus, the anti-lock valve ALV of the normally open type, provided in the fluid passage 56 communicating with the auxiliary fluid pressure chamber 54, closes only at the time of the anti-lock control so as to block or close the fluid passage communicating the valve chambers 18 and 19 with the reservoir 11 via the auxiliary fluid pressure chamber 54. Also, the fluid passage 56 communicates with the fluid passages 21 and 20 interconnecting the fluid pressure chambers 5 and 6, and the auxiliary fluid pressure chamber 54 communicates with the reservoir 11 through the fluid passage 57 having the traction valve TCV of the normally open type which closes only at the time of the traction control.

With this arrangement, except when effecting the anti-lock control and the traction control, the pressures within the valve chambers 18 and 19 and the auxiliary fluid pressure chamber 54 are atmospheric pressure, so that except when effecting the anti-lock control and the traction control, any fluid pressure remains in the fluid passage extending from the supply valve PWV to the traction valve TCV via the anti-lock valve ALV.

Figure 2:
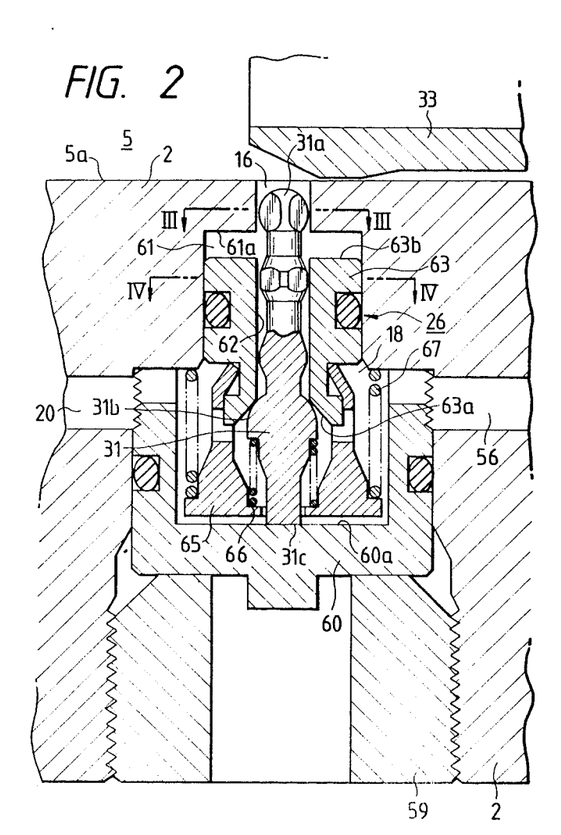
FIG. 2 is an enlarged cross-sectional view of a valve mechanism of the control apparatus.

FIG. 2 shows the valve mechanism 26 on an enlarged scale. The valve chamber 18 is formed by a substantially cup-shaped plug 60 mounted within the housing 2 and fixed thereto by a set screw 59. A piston chamber 61 is formed in the housing 2 immediately adjacent to the opening 16 through which the valve chamber 18 communicates with the fluid pressure chamber 5, the piston chamber 61 being disposed in coaxial relation to the opening 16. A piston 63, having a central bore 62 formed axially therethrough, is received in the piston chamber 61 so that the piston 63 is slidable in alignment with the opening 16 in a direction perpendicular to an inner peripheral surface 5a of the fluid pressure chamber 5. The piston 63 serves as a valve holding member. A valve seat 63a of a conical shape is formed on one end of the central bore 62 remote from the opening 16.

Figure 3:
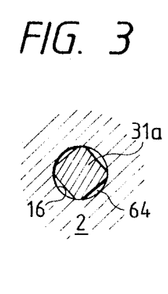
FIG. 3 is a cross-sectional view taken along the line III—III of FIG. 2.
Figure 4:
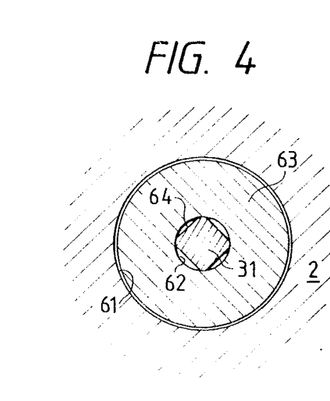
FIG. 4 is a cross-sectional view taken along the line IV—IV of FIG. 2.

The intake valve 31 is in the form of a bar-like poppet valve and slidably extends through the opening 16 and the central bore 62 of the piston 63 so that a distal end 31a of the intake valve 31 is movable into and out of the fluid pressure chamber 5. The intake valve 31 has a valve portion 31b of a semi-spherical shape, which is seated on the valve seat 63a. As shown in FIGS. 3 and 4, the distal end 31a of the intake valve 31 as well as a portion of its shank has a generally square cross-section, and the four corners thereof serving as support portions are held in sliding contact with the inner peripheral surface of the opening 16 and the inner peripheral surface of the central bore 62 of the piston 63, thereby preventing the tilting (and hence a frictional movement) of the intake valve 31 when the intake valve 31 is pushed down by the intake sleeve 33, thus ensuring a smooth sliding movement of the intake valve 31. The above square cross-sectional portions also serve to provide fluid passages 64 around the intake valve 31.

A spring holder 65 is fixedly secured to the piston 63, and a check spring 66 in the form of a compression spring acts between the spring holder 65 and the intake valve 31 to urge the valve portion 31b of the intake valve 31 against the valve seat 63a of the piston 63 under a predetermined check pressure. Also, a set spring 67 in the form of a compression spring acts between the spring holder 65 and a wall of the valve chamber 18 to urge the piston 63 away from the opening 16. The spring bias applied by the set spring 67 is greater than that applied by the check spring 66, and the piston 63 is held in a position shown in FIG. 2 under the bias of the set spring 67 when a proximal end face 31c of the intake valve 31 is held against a bottom surface 60a of the plug 60. The set spring 67 also serves to urge the valve seat 63a of the piston 63 against the valve portion 31b of the intake valve 31. More specifically, except when effecting the anti-lock control and the traction control, the supply valve PWV closes, and the anti-lock valve ALV and the traction valve TCV both open, as is clear from FIG. 1. Therefore, the valve chamber 18 is not subjected to the fluid pressure, and the end face 63b of the piston 63 is spaced apart from a wall surface 61a of the piston chamber 61, so that the distal end 31a of the intake valve 31 is completely received within the opening 16.

When the brake pedal 37 is pressed down to move the primary piston 3 to increase the fluid pressure in the fluid pressure chamber 5, the fluid pressure thus increased is applied to the end face 63b of the piston 63, so that the valve seat 63a of the piston 63 is further pressed against the valve portion 31b of the intake valve 31, thereby enhancing a sealing effect of the valve portion 31b.

Figure 5:
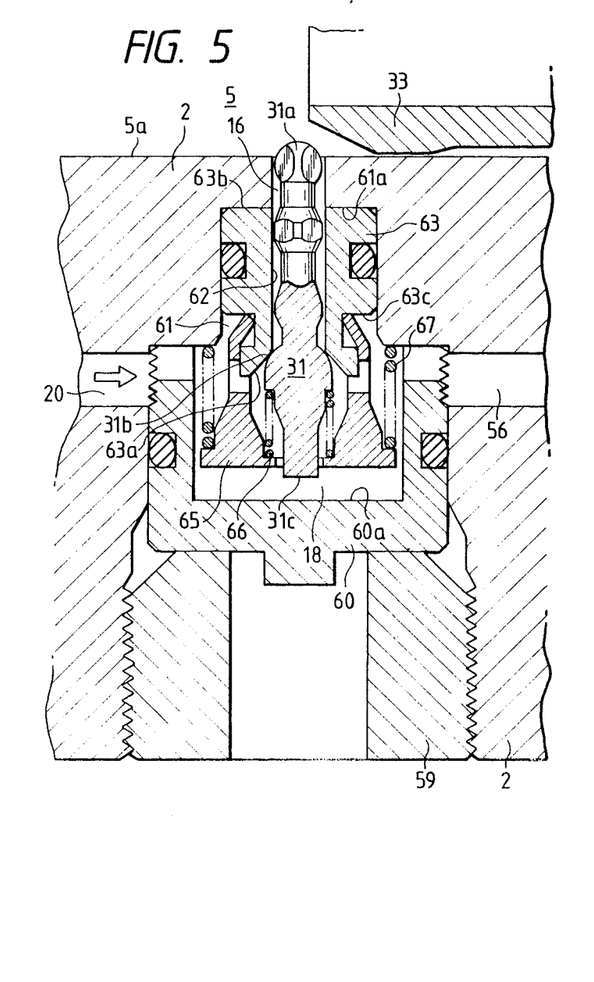
FIGS. 5 and 6 are views similar to FIG. 2, showing the operation of the valve mechanism.

FIG. 5 shows the condition of the valve mechanism 26 when the anti-lock control or the traction control starts to open the supply valve PWV and to close the anti-lock valve ALV or the traction valve TCV, thereby interrupting the communication between the valve mechanism and the reservoir. In this case, since the brake fluid under a high pressure is fed from the accumulator 22 to the valve chamber 18 through the fluid passages 21 and 22, the fluid pressure is applied to the end face 63c of the piston 63 opposite to the end face 63b. As a result, the piston 63 is moved toward the opening 16 against the bias of the set spring 67, with the intake valve 31 held against the valve seat 63a under the influence of the check spring 66, so that the end face 63b is brought into abutting engagement with the wall surface 61a of the piston chamber 61.

Figure 6:
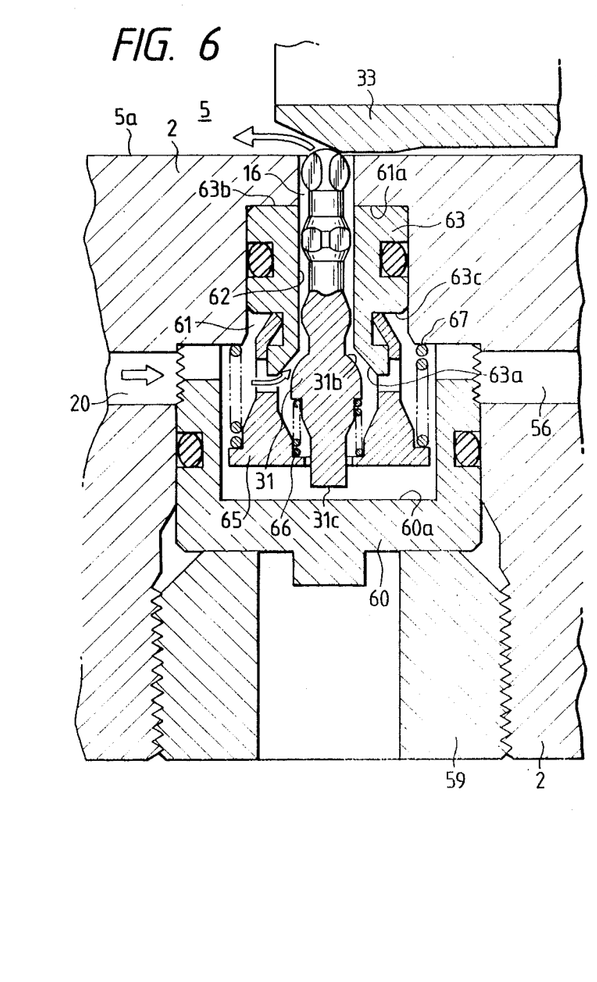

In this condition, the distal end 31a of the intake valve 31 projects into the fluid pressure chamber 5. Therefore, when the primary piston 3 is moved in a left- hand direction (FIG. 1), the intake sleeve 33 is brought into engagement with the distal end 31a of the intake valve 31, as shown in FIG. 6, to push down the intake valve 31 against the bias of the check spring 66. As a result, the valve portion 31b is brought out of contact with the valve seat 63a of the piston 63 to thereby apply the high-pressure brake fluid, fed from the accumulator 22, to the fluid pressure chamber 5.

Figure 7:
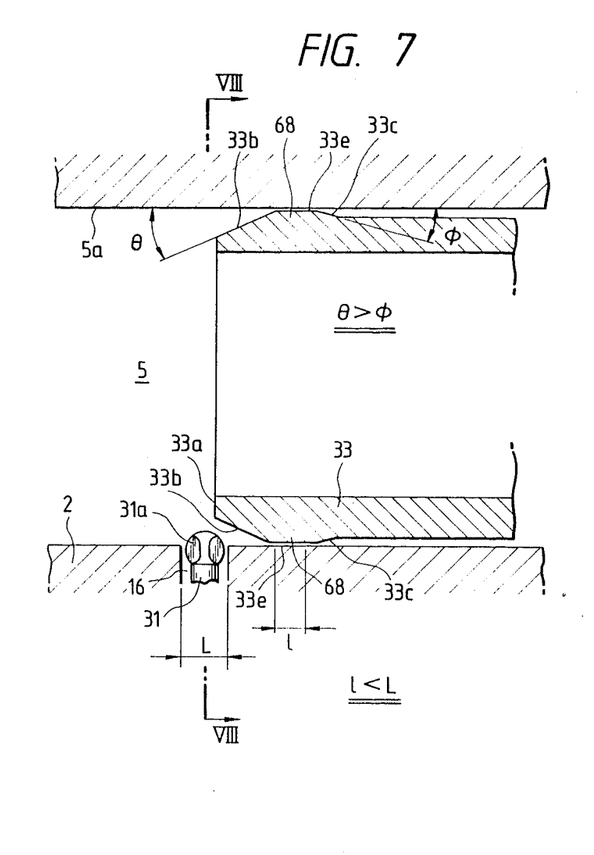
FIG. 7 is a longitudinal cross-sectional view of a portion of an intake sleeve.
Figure 8:
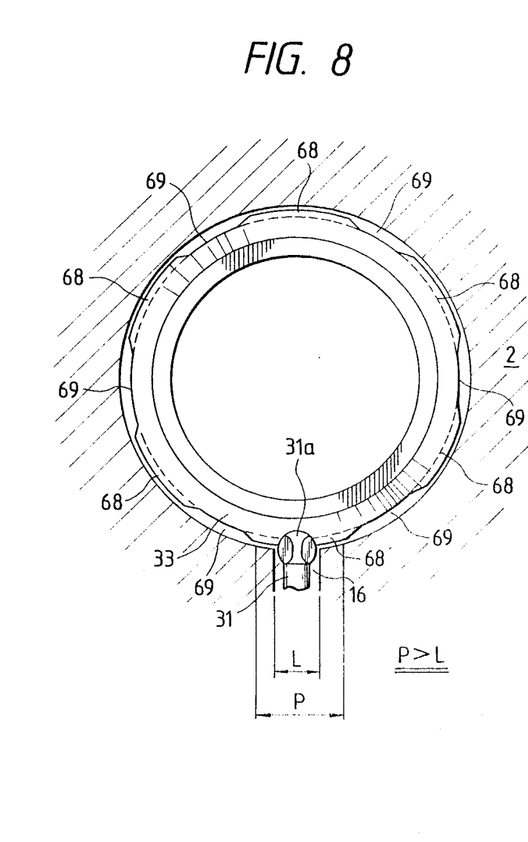
FIG. 8 is a cross-sectional view taken along the line VIII—VIII of FIG. 7.

FIG. 7 is a longitudinal cross-sectional view of a front portion of the intake sleeve 33 for operating the intake valve 31, and FIG. 8 is a front end view of the intake sleeve 33.

When the intake sleeve 33 pushes down the intake valve 31, the intake sleeve 33 may sometimes be tilted because of a reaction force encountered and fail to move smoothly. In this embodiment, to prevent this, a plurality of support projections 68 are formed on the outer peripheral surface of the cylindrical intake sleeve 33 adjacent to its front end 33a in circumferentially spaced relation to one another. The support projections 68 are disposed in sliding contact with the cylindrical inner peripheral surface 5a of the fluid pressure chamber 5, and the support projections 68 cooperate with the inner peripheral surface 5a to provide a plurality of fluid passages 69 spaced circumferentially from one another by the support projections 68. Each support projection 68 has a support surface 33e extending along a longitudinal axis of the intake sleeve 33 and held in sliding contact with the inner peripheral surface 5a of the fluid pressure chamber 5. An engaging surface 33b of each support projection 68 extends between the support surface 33e and front end 33a of the intake sleeve 33 and is tapered toward the front end 33a.

The engaging surface 33b is inclined radially inwardly of the intake sleeve 33 at an angle of $\theta$ with respect to the longitudinal axis of the intake sleeve 33. The support projection 68 also has a rear surface 33c extending rearwardly from the support surface 33e, the rear surface 33c being tapered away from the support surface 33e and inclined radially inwardly of the intake sleeve 33 at an angle of $\phi$ with respect to the longitudinal axis of the intake sleeve 33 ($\theta > \phi$). The axial length $l$ of the support surface 33e of the support projection 68 is shorter than the diameter $L$ of the opening 16 of a circular cross-section in which the distal end 31a of the intake valve 31 is received. The width $P$ (shown in FIG. 8), that is, the circumferential dimension, of the support projection 68 is greater than the diameter $L$ of the opening 16. With this arrangement, the intake sleeve 33 is prevented from being tilted upon engagement with the intake valve 31, and it is intended that the support projection 68 will not fully close the opening 16. The other valve mechanism 27 and the other intake sleeve 34 are identical in construction and operation to the above-mentioned valve mechanism 26 and intake sleeve 33, respectively.

The operation of the brake fluid pressure control apparatus of FIG. 1 will now be described with reference to FIGS. 9 and 10.

Figure 9:
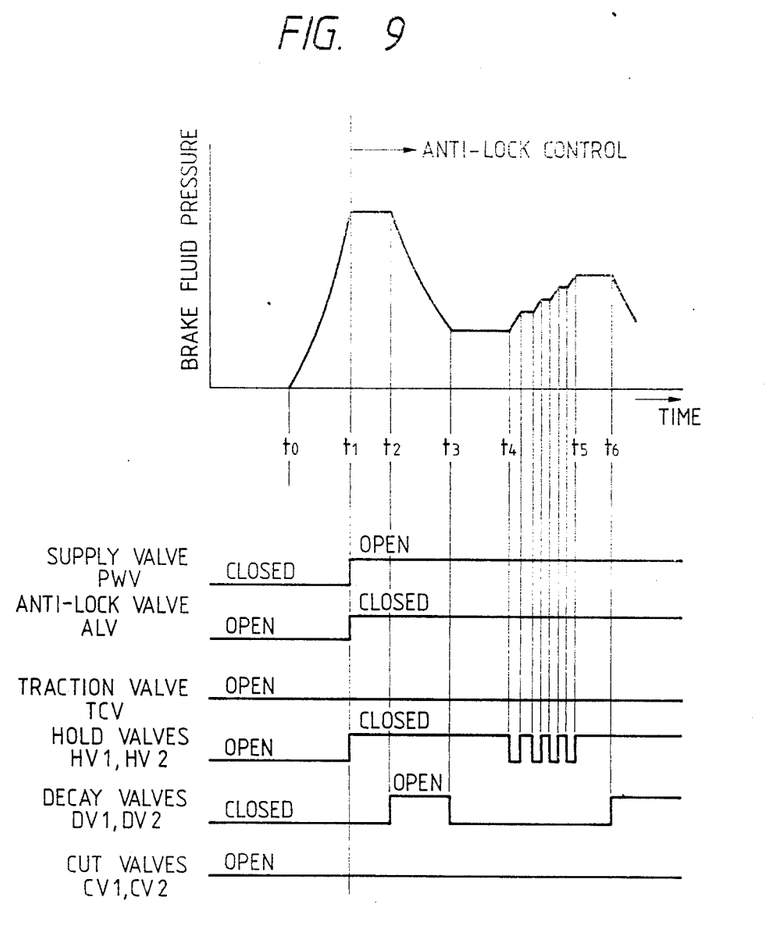
FIG. 9 is a time chart illustrative of an anti-lock control effected by the control apparatus.

FIG. 9 is a time chart showing a variation in the brake fluid pressure at the time of the normal braking operation and subsequent anti-lock control, as well as the conditions of the supply valve PWV, the anti-lock valve ALV, the traction valve TCV, the hold valves HV1 and HV2, the decay valves DV1 and DV2, and the cut valves CV1 and CV2.

Actually, although the fluid pressures in the two brake lines of the dual circuit brake device are controlled independently of each other, the operation will be described here, assuming that the two brake lines are simultaneously operated for the sake of brevity.

(A) Normal Braking Operation (from time $t_0$ to time $t_1$ in FIG. 9)

When the brake pedal 37 is pressed down with the supply valve PWV closing, the anti-lock valve ALV and the traction valve TCV open, the hold valves HV1 and HV2 open and the decay valves DV1 and DV2 closing, and cut valves CV1 and CV2 open, as shown in FIG. 1, the primary piston 3 is pushed by the push rod 38 to move in the left-hand direction (FIG. 1) to close the center valve 35, so that the secondary piston is also moved in the left-hand direction to close the center valve 36. As a result, the fluid pressures develop in the fluid pressure chambers 5 and 6 are supplied to the wheel cylinders 8, 9, 13 and 14 to effect the braking operation, since the valve mechanisms 26 and 27 are in the conditions shown in FIG. 2.

(B) Anti-lock Control

When it is detected that the system or line speed (the wheel speed of each brake line to be controlled, for example, the select-low speeds of the right front and left rear wheels FR and RL) is decelerated beyond a predetermined level due to the increase in the fluid pressures in the wheel cylinders 8, 9, 13 and 14, a control circuit (not shown) which comprises a microcomputer feeds a holding signal. From this time, that is, time $t_1$, the anti-lock control is started.

(1) Holding Mode (from time $t_1$ to time $t_2$ in FIG. 9)

At time $t_1$ (FIG. 9), the supply valve PWV is opened, the anti-lock valve ALV is closed, and the hold valves HV1 and HV2 are closed. As a result, the fluid passage 7 leading to the wheel cylinders 8 and 9, as well as the fluid passage 12 leading to the wheel cylinders 13 and 14 are blocked, so that the fluid pressures within the wheel cylinders 8, 9, 13 and 14 are held or maintained. At this time, the valve mechanisms 26 and 27 are in the condition shown in FIG. 5, and the distal ends 31a and 32a of the intake valves 31 and 32 project into the fluid pressure chambers 5 and 6, respectively. At this time, if the intake sleeves 33 and 34 are so positioned as to push down the respective intake valves 31 and 32, the valve mechanisms 26 and 27 are brought into the condition shown in FIG. 6, so that the brake fluid of a high pressure is fed from the accumulator 22 to the fluid pressure chambers 5 and 6 via the fluid passages 21 and 20. This brake fluid causes the pistons 3 and 4 to return to such positions that the intake sleeves 33 and 34 are brought out of engagement of the respective intake valves 31 and 32, and the fluid pressure in the fluid pressure chambers 5 and 6 is proportional to the force of the pressing-down of the brake pedal 37. In this case, because of the positions of the primary piston 3 and the secondary piston 4, the intake sleeves 33 and 34 push down the respective intake valves 31 and 32 to communicate the fluid pressure chambers 5 and 6 with the accumulator 22, so that the pistons 3 and 4 are returned by the fluid pressure, fed from the accumulator 22, to such positions that the intake valves 31 and 32 close the respective openings 16 and 17. Therefore, even if a malfunction develops in the fluid pressure source system during the control, sufficient fluid pressure is held within the fluid pressure chambers 5 and 6.

(2) Pressure Decreasing Mode (from time $t_2$ to time $t_3$ in FIG. 9)

When the above-mentioned system speed is further lowered, the decay valves DV1 and DV2 are opened from time $t_2$, so that the brake fluids within the wheel cylinders 8, 9, 13 and 14 flow into the reservoir 11 through the fluid passages 10 and 15 to decrease the fluid pressures within these wheel cylinders.

(3) Holding Mode (from time $t_3$ to time $t_4$ in FIG. 9)

At time $t_3$ when the above-mentioned system speed begins to recover from its low peak value because of the above decrease in the brake fluids, the decay valves DV1 and DV2 are closed to again put the control in the holding mode.

(4) Pressure Increasing Mode (From time $t_4$ to time $t_5$ in FIG. 9)

When the above-mentioned system speed reaches its high peak value, the hold valves HV1 and HV2 are opened, so that the pistons 3 and 4 are moved to open the intake valves 31 and 32, and the fluid pressure within the accumulator 22 is supplied to the wheel cylinders 8, 9, 13 and 14 through the fluid pressure chambers 5 and 6. In the pressure increasing mode which is started from time $t_4$ in FIG. 9, the hold valves HV1 and HV2 are opened and closed at short time intervals, so that the brake fluid pressures are increased in a step-like manner.

(5) Holding Mode (from time $t_5$ to time $t_6$ in FIG. 9)

When the above-mentioned system speed begins to be lowered because of the increase in the brake fluid pressure, the control is again put in the holding mode, so that the hold valves HV1 and HV2 are closed. Then, at time $t_6$, the decay valves DV1 and DV2 are opened to again put the control in the pressure decreasing mode.

(C) Traction Control

In the case of the traction control for preventing a slip of the drive wheels FR and FL at the time of starting the vehicle or accelerating it, the pressure increasing mode is started from the time (time $t_{11}$ in FIG. 10) when the control circuit (not shown) which comprises a microcomputer detects a slip of the drive wheels FR and FL.

Figure 10:
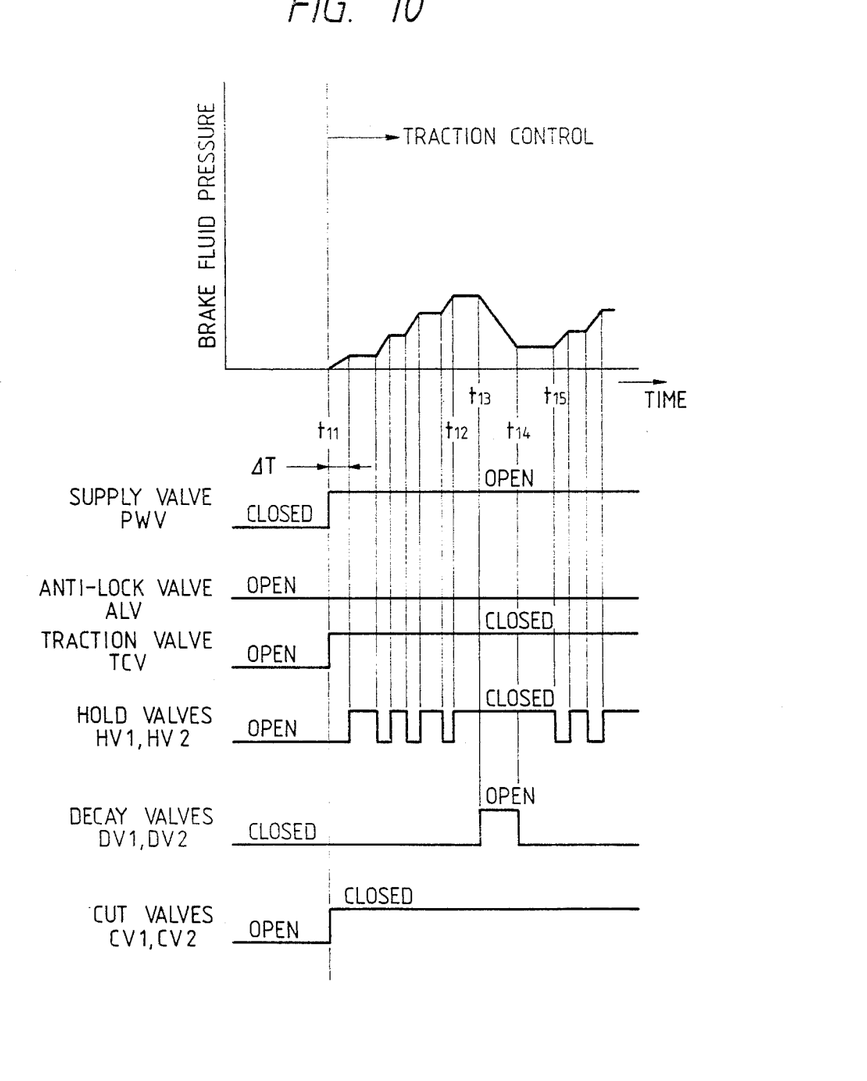
FIG. 10 is a time chart illustrative of a traction control effected by the control apparatus.

(1) Pressure Increasing Mode (from time $t_{11}$ to time $t_{12}$ in FIG. 10)

At time $t_{11}$ (FIG. 10), the cut valves CV1 and CV2 and the traction valve TCV are closed. Therefore, the communication between the fluid pressure chamber 5 (main fluid pressure chamber) of the master cylinder 1 and the wheel cylinder 9 for the non-driving wheel RL, the communication between the fluid pressure chamber 6 (main fluid pressure chamber) of the master cylinder 1 and the wheel cylinder 14 for the non-driving wheel RR, and the communication between the auxiliary fluid pressure chamber 54 and the reservoir 11 are interrupted. Also, the supply valve PWV is opened, and the anti-lock valve ALV is opened, and therefore the auxiliary fluid pressure chamber 54 is caused to communicate with the accumulator 22. As a result, the pressure within the auxiliary fluid pressure chamber 54 is increased, so that the auxiliary piston 53 is moved in the left-hand direction (FIG. 1). As a result, the primary piston 3 is urged by the auxiliary piston 53 to be moved in the left-hand direction, so that the brake fluids within the wheel cylinders 8 and 13 are increased to put the control in the pressure increasing mode. During a predetermined time period $\Delta T$ after the initiation (time $t_{11}$) of the traction control, the hold valves HV1 and HV2 are held in their open conditions, and during this time period a preliminary pressure increasing is effected, and then the hold valves HV1 and HV2 are closed to hold or maintain the brake fluid pressures. Thereafter, the hold valves HV1 and HV2 are opened and closed at short time intervals, so that the brake fluid pressures are increased in a step-like manner.

(2) Holding Mode (from time $t_{12}$ to time $t_{13}$ in FIG. 10)

From time $t_{12}$ when the slip of the drive wheels FR and FL becomes less, the hold valves HV1 and HV2 are closed to put the control in the holding mode.

(3) Pressure Decreasing Mode (from time $t_{13}$ to time $t_{14}$ in FIG. 10)

From time $t_{13}$, the decay valves DV1 and DV2 are closed to put the control in the pressure decreasing mode, and thereafter each mode is repeated as in the anti-lock control.

The pressure-receiving annular stepped portion 53b of the auxiliary piston 53 receives the fluid pressure in the auxiliary fluid pressure chamber 54 which fluid pressure is equal to the fluid pressure accumulated in the accumulator 22. And, the area of the primary piston 3 which receives the fluid pressure in the fluid pressure chamber 5 is substantially equal to the cross-sectional area of the fluid pressure chamber 5. Therefore, the fluid pressure $P_M$ within the fluid pressure chamber 5 in the closed condition of the intake valve 31 is represented by the following formula:

$$P_M = (A_B / A_M) \times P_A$$

where $A_M$ represents the pressure receiving area of the primary piston 3, $A_B$ represents the pressure receiving area of the auxiliary piston 53, and $P_A$ represents the fluid pressure in the accumulator 22.

More specifically, the fluid pressure $P_M$ within the fluid pressure chamber 5 can be determined by the pressure receiving ratio of $A_B/A_M$. Therefore, if this ratio is set to less than 1, then the maximum fluid pressure applied to the wheel cylinders 8 and 13 is less than the fluid pressure $P_A$ in the accumulator 22, which can prevent vibration of the vehicle, which would be caused by the application of an excessive braking force at the time of the traction control, thereby enabling the smooth traction control and preventing an excessive load from being applied to the drive system.

As described above, the apparatus of the present invention comprises the fluid passages 20 and 21 connecting the fluid pressure chambers 5 and 6 to the accumulator 22, the supply valve PWV provided in the fluid passage 21 so as to be opened at the time of the anti-lock control, the intake valves 31 and 32 provided respectively in the openings 16 and 17 of the fluid passage (constituted by the fluid passages 20 and 21) opening respectively to the fluid pressure chambers 5 and 6, so as to normally close the openings 16 and 17, and the intake sleeves 31 and 32 which are mounted respectively on the pistons 3 and 4 so as to move in unison therewith, and are brought into engagement with the intake valves 31 and 32, respectively, to open them when the stroke of the pistons 3 and 4 reaches a predetermined value. With this construction, even if there occurs a malfunction in the fluid pressure source system during the anti-lock control, the intake valves 31 and 32 are opened in accordance with the movement of the pistons 3 and 4, so that the brake fluid of a high pressure is applied from the accumulator 22 to the fluid pressure chambers 5 and 6. As a result, the pistons 3 and 4 are returned to the preselected positions to secure a sufficient room for pressing-down of the brake pedal 37, and also the fluid pressure proportional to the force of pressing-down of the brake pedal 37 can be supplied to the wheel cylinders 8, 9, 13 and 14.

Further, in the present invention, the anti-lock valve ALV of the normally open type is provided in the fluid passage 56 connected to the auxiliary fluid pressure chamber 54, and the anti-lock valve ALV is closed only at the time of the anti-lock control to block or shut off the fluid passage connecting the valve chambers 18 and 19 to the reservoir 11. The fluid passage 56 is connected to the fluid passages 21 and 22, and the auxiliary fluid pressure chamber 54 is connected to the reservoir 11 through the fluid passage 57 in which the traction valve TCV of the normally open type is provided for being closed only at the time of the traction control. With this arrangement, except when effecting the anti-lock control and the traction control, the pressures within the valve chambers 18 and 19 and the auxiliary fluid pressure chamber 54 are atmospheric pressure, and the fluid pressure does not remain in the fluid passage extending from the supply valve PWV to the traction valve TCV via the anti-lock valve ALV. Therefore, the smooth and accurate anti-lock control and traction control can be carried out.

Further, in the present invention, the distal ends 31a and 32a of the intake valves 31 and 32 do not project respectively into the fluid pressure chambers 5 and 6 at the normal control, and project thereinto only at the time of the anti-lock control and the traction control so that they can engage the intake sleeves 33 and 34, respectively. With this construction, the durability of the intake valves 31 and 32 are enhanced. During the normal control, the piston 63 is urged by the fluid pressure in the fluid pressure chamber 5 (6), and therefore this fluid pressure serves to urge the valve seat 63a of the piston 63 against the valve portion 31b of the intake valve 31, thus providing a good seal of the valve portion 31b during the normal control.

Further, since the support portions are provided on the outer peripheral surfaces of the intake valves 31 and 32 and the intake sleeves 33 and 34, they are not tilted and can be smoothly moved when they are brought into engagement with each other.

WHAT IS CLAIMED IS:

1. A brake fluid pressure control apparatus, comprising:
   an accumulator;
   a reservoir;
   first fluid passage means communicating with the wheel cylinders of the vehicle;
   second fluid passage means communicating the wheel cylinders with said reservoir;
   valve means for increasing, holding and decreasing a brake fluid pressure supplied to the wheel cylinders of the vehicle during an anti-lock control and a traction control, said valve means comprising a first valve means provided in said first fluid passage and a second valve means provided in said second fluid passage; and
   a master cylinder comprising:
   a housing;
   a fluid pressure chamber means provided in said housing, said fluid pressure chamber communicating with said first fluid passage means;
   a third fluid passage communicating said accumulator with said fluid pressure chamber;
   an intake valve means provided in said third fluid passage, said intake valve normally shutting off said third fluid pressure chamber, said intake valve means having an end which is movable into and out of said fluid pressure chamber means;
   a main piston means slidably provided in said housing, said main piston means being operated by the brake pedal of the vehicle;
   a valve operating means mounted on said main piston means, said valve operating means being engageable with said end of said intake valve means projecting into said fluid pressure chamber means while said intake valve means opens when the stroke of said main piston means reaches a predetermined value;
   an auxiliary piston slidably mounted around said main piston means, said auxiliary piston urging said main piston means to move during the traction control;
   an auxiliary fluid pressure chamber provided between said auxiliary piston and an inner peripheral surface of said housing, a fluid pressure within said auxiliary fluid pressure chamber acting on said auxiliary piston;
   a fourth fluid passage communicating said auxiliary fluid pressure chamber with a portion of said third fluid passage which is opposite said accumulator with respect to said intake valve means; and
   a fifth fluid passage communicating said auxiliary fluid pressure chamber with said reservoir.

2. The brake fluid pressure control apparatus of claim 1, further comprising:
   a supply valve of a normally closed type, said supply valve being provided in said third fluid passage at a portion between said accumulator and said intake valve means, said supply valve opening during the anti-lock control and the traction control;
   an anti-lock valve of a normally open type, said anti-lock valve being provided in said fourth fluid passage at a portion between said auxiliary fluid pressure chamber and said intake valve means, said anti-lock valve opening only during the anti-lock control; and
   a traction valve of a normally open type, said traction valve being provided in said fifth fluid passage at a portion between said auxiliary fluid pressure chamber and said reservoir.

3. The brake fluid pressure control apparatus of claim 1, wherein:
   said first fluid passage means comprises a first fluid passage communicating with the left right and right front wheel cylinders of the vehicle and second fluid passage communicating with the left front and right rear wheel cylinders of the vehicle;

said second fluid passage means comprises a third fluid passage communicating with the right front and left rear wheel cylinders and fourth fluid passage communicating with the right rear and left front wheel cylinders of the vehicle;

said first valve means comprises a first hold valve provided in said first fluid passage and second hold valve provided in said second fluid passage; and said second valve means comprises a first decay valve provided in said third fluid passage and second decay valve provided in said fourth fluid passage.

4. The brake fluid pressure control apparatus of claim 3, wherein:

said fluid pressure chamber means comprises a first fluid pressure chamber communicating with said first fluid passage and a second fluid pressure chamber communicating with said second fluid passage;

said intake valve means comprises a first intake valve provided between said third fluid passage and said first fluid pressure chamber and a second intake valve provided between said third fluid passage and said second fluid pressure chamber;

said valve operating means comprises a first intake sleeve engageable an end of said first intake valve and said second intake sleeve engageable with an end of said second intake valve; and said main piston means comprises a primary piston operated in connection with the brake pedal of the vehicle and a secondary piston.

5. The brake fluid pressure control apparatus of claim 3, further comprising:

a first cut valve provided in said first fluid passage at a portion between said first hold valve and said left rear wheel cylinder; and a second cut valve provided in said second fluid passage at a portion between said second hold valve and said right rear wheel cylinder.

6. The brake fluid pressure control apparatus of claim 5, wherein said first and second cut valve consist of a solenoid valve.

7. The brake fluid pressure control apparatus of claim 2, wherein said first and second valve means, said supply valve and said traction valve consist of a solenoid valve.

8. The brake fluid pressure control apparatus of claim 4, further comprising:

a pair of stem having a head and a threaded end;

a pair of center valve;

means for holding said center valve, said center valve holding means engaged with said threaded end of said stems;

a pair of stop bushing connected at one end to said secondary piston and to said head of said stem at the other end;

first springs acting between said stop bushings and said intake sleeves; and a pair of second springs provided between said intake sleeves and said center valve holding means, said second springs urging said center valves into its closed position.

9. The brake fluid pressure control apparatus of claim 8, wherein said center valve shutting out the communicating between said reservoir and said fluid pressure chamber means according to the movement of said main piston while the brake pedal is actuated.

10. The brake fluid pressure control apparatus of claim 1, wherein said intake valve means comprising:

a plug mounted within said housing and fixed thereto, said plug being substantially cup-shaped to form a valve chamber;

a piston chamber formed in said housing, said piston chamber communicating said valve chamber with said fluid pressure chamber means, said piston chamber being disposed in coaxial relation to an opening which communicates with said fluid pressure chamber means;

a piston having a central bore formed axially therethrough, said piston being received in said piston chamber, said piston being slidable in alignment with said opening in a direction perpendicular to an inner peripheral surface of said fluid pressure chamber means, said piston being provided with a valve seat;

a valve body provided in said piston, said valve being held by said valve seat of said piston, said valve body having an end movable into and out of said fluid pressure chamber;

a spring holder fixedly secured to said piston;

a third spring disposed between said spring holder and said valve body; and a fourth spring disposed between said spring holder and a wall of said valve chamber.

11. The brake fluid pressure control apparatus of claim 10, wherein said end of said valve body projecting into said fluid pressure chamber during the anti-lock and traction controls.

12. The brake fluid pressure control apparatus of claim 10, wherein said end of said valve body is substantially square in cross-section.

13. The brake fluid pressure control apparatus of claim 10, wherein said valve operating means is provided with an engaging portion slightly projecting therefrom to form a first angle and a second angle with respect to the longitudinal axis of said valve operating means, said first angle is larger than said second angle.

14. The brake fluid pressure control apparatus of claim 10, the axial length of a width of said projecting engaging portion of said valve operating means is smaller than the diameter of said opening of said piston chamber.

15. The brake fluid pressure control apparatus of claim 10, wherein the circumferential dimension of said projecting engaging portion of said valve operating means is greater than the diameter of said opening of said piston chamber.

16. The brake fluid pressure control apparatus of claim 1, wherein the fluid pressure PM within said fluid pressure chamber means in the closed condition of said intake valve means is represented by the formula:

$$P_M = (A_b/A_M) \times P_A$$

where AM represents the pressure receiving area of said main piston means, AB represents the pressure receiving area of said auxiliary piston, and PA represents the fluid pressure in said accumulator.

* * * * *